Oct. 15, 1940.  C. J. LEMONT  2,218,004
PORCELAIN INSULATOR SCREW BRACKET
Filed May 28, 1936  2 Sheets-Sheet 1
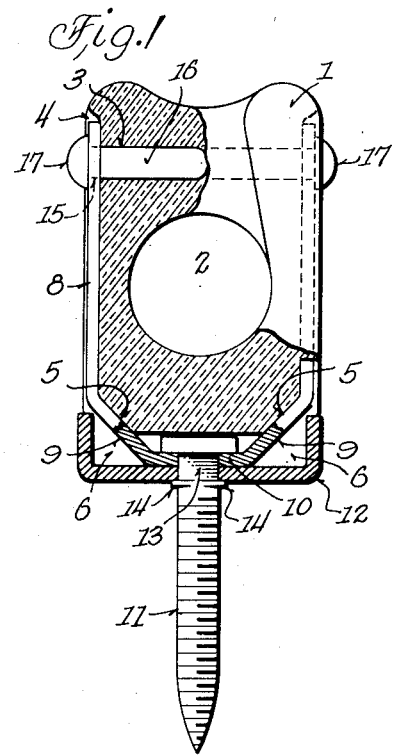
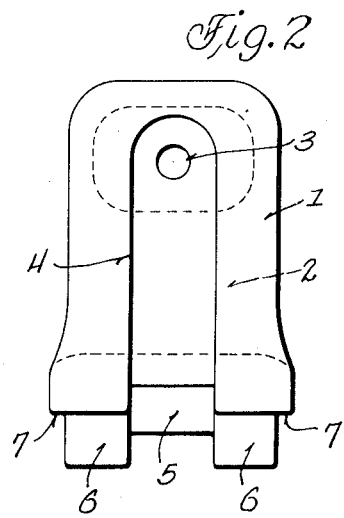
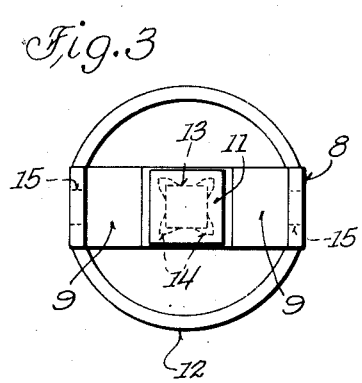
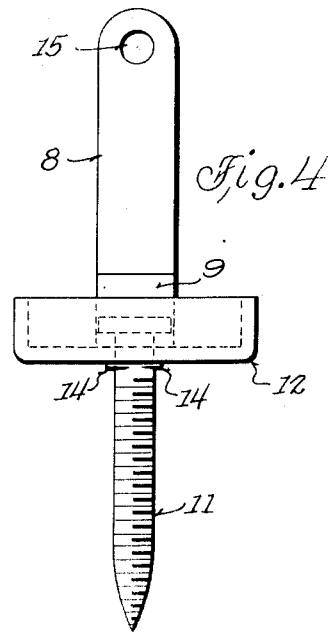
Clarence J. Lemont
INVENTOR.
BY Chester W. Brown
ATTORNEY.

Oct. 15, 1940.  C. J. LEMONT  2,218,004
PORCELAIN INSULATOR SCREW BRACKET
Filed May 28, 1936  2 Sheets-Sheet 2

Clarence J. Lemont
INVENTOR.

BY Chester W. Brown

ATTORNEY.

Patented Oct. 15, 1940

2,218,004

UNITED STATES PATENT OFFICE 2,218,004

PORCELAIN INSULATOR SCREW BRACKET

Clarence J. Lemont, South Milwaukee, Wis., assignor to Line Material Company, South Milwaukee, Wis., a corporation of Delaware Application May 28, 1936, Serial No. 82,239

5 Claims. (Cl. 174—154)

This invention relates to improvements in porcelain insulator screw brackets.

It is an object of this invention to provide an insulator screw bracket comprising an insulating member, a base member, a reinforcing yoke member, and a lag screw secured together in comparatively rigid relationship.

A further object is to provide a base member and a reinforcing yoke member rigidly secured together by means of a lag screw, thereby being adapted for assembly as a unit on an insulating member.

A still further object is to provide an insulator screw bracket which will require a minimum number of manufacturing and assembling operations, which will be efficient and serviceable in operation even though the insulator becomes damaged, and which will be available at a minimum cost.

Other objects will be apparent from the following description of the device disclosed herein.

In the drawings:

Fig. 1 is a view in side elevation showing the elements of the bracket partially in sectional view.

Fig. 2 is a view in side elevation showing the insulator turned ninety degrees (90°) from the position in which it is shown in Fig. 1.

Fig. 3 is a top plan view of the base member, yoke member and lag screw shown in Fig. 1.

Fig. 4 is a view in side elevation of the parts shown in Fig. 3.

Throughout the several views like parts are identified by the same reference characters.

Figure 5:
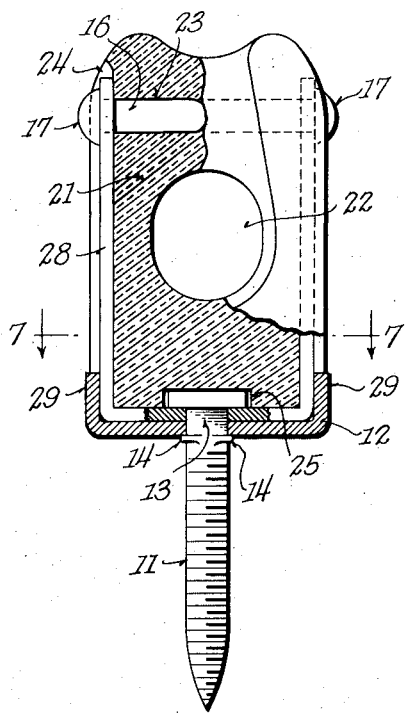
Fig. 5 is a modified embodiment of the invention shown in Fig. 1.
Figure 6:
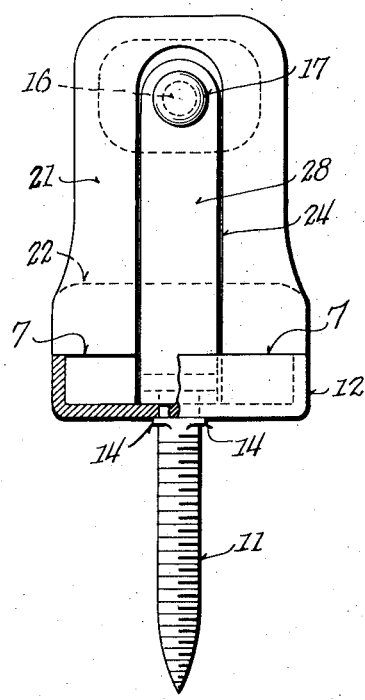
Fig. 6 is a view in side elevation taken at ninety degrees (90°) relative to the view of the device shown in Fig. 5.

In Figs. 1 and 2, the insulator 1 preferably comprises a body of porcelain having a transverse hole or aperture 2 adapted to receive a wire or cable (not shown). The insulator is also provided with a smaller transverse hole or aperture 3 disposed at right angles to the aperture 2 and spaced therefrom toward the upper end of the insulator. A channel 4 in the insulator 1 extends from one end of the aperture 3, across the lower end of the insulator 1 and to the other end of the aperture 3 at the opposite side of the insulator. In effect, the hole 3 and channel 4 comprise a channel extending completely around the aperture 2. The lower corners of the channel 4 are beveled at 5. That portion of the channel 4 extending across the lower end of the insulator 1 provides arcuate leg portions 6 on the insulator. These leg portions are bounded at the upper ends thereof by shoulders 7.

Disposed in the channel 4, is a U-shaped metal strip 8 extending from one end of the aperture 3, across the lower end of the insulator 1 and to the other end of the aperture 3 on the opposite side of the insulator. The yoke member 8 is shaped at 9 to conform to the bevels 5 of the channel, and is spaced at 10 from the bottom of the channel 4 at the lower end of the insulator to accommodate the head of the lag screw 11.

A cup-shaped metal base member 12 surrounds the legs 6 of the insulator 1 and is disposed beneath the shoulders 7. The lag screw 11 extends through the yoke member 8 and the base member 12 and is provided with a squared portion 13 on its shank complementary to squared apertures in the yoke member 8 and the base member 12. Thus the lag screw 11, U-shaped member 8 and base member 12 are secured against relative rotation. In order to secure these elements against separation, the corners of the squared shank portion 13 are sheared toward the head of the screw to provide riveting portions 14 clamping the base member and U member to the lag screw.

The upper ends of the U member 8 are each provided with an aperture 15 through which the bolt or rivet 16 extends. This rivet 16 is disposed in the aperture 3 and is headed at 17 to permanently secure the yoke member 8 to the insulator 1.

From the foregoing description, it will be observed that the lag screw 11, base member 12 and yoke member 8 comprise a unitary structure in which they are non-rotatively engaged and which may be secured as a unit to the insulator. Beveling of the yoke member 8 at 9 permits the use of a base member 12 smaller in diameter than would be possible if the yoke member extended to the bottom of the base member immediately adjacent the side wall thereof. If the base member 12 of the size illustrated in Fig. 1 is used, the beveling of the yoke member 8 permits more material in the porcelain, for, otherwise, the channel 4 would necessarily have to be deeper.

As will be observed in Fig. 5, the modified form of the screw bracket comprises an insulator 21 provided with a wire-receiving aperture 22 and a smaller aperture 23 disposed at right angles relative to the aperture 22 and spaced therefrom toward the upper end of the porcelain 21. The insulator 21 is provided with a channel 24 extending from one end of the aperture 23, across the lower end of the insulator and to the other end of the aperture 23. The channel at the lower end of the insulator is provided with a recess 25 adapted to receive the head of the lag screw 11. A cup-shaped base member 12 is positioned upon the lower end of the insulator 21 and beneath the shoulders 7 on the insulator.

Positioned within the channel 24, is a U member 28 which extends from one end of the aperture 23, across the lower end of the insulator 21 and to the other end of the aperture 23. This U member extends to the bottom of the base member 12 adjacent the inner wall thereof. A lag screw 11 extends through the U member and the base member and is provided with a squared shank portion 13 complementary to like squared apertures in the U member 28 and the base member 12, thereby holding these members in relatively non-rotative relationship. The U member and base member are permanently secured together by shearing the corners of the squared portion 13 as shown at 14.

After the yoke member 28 and base member 12 have been secured together as noted, the insulator 21 is positioned as shown, within the yoke member and a bolt or rivet 16 is positioned within the aperture 23 and extending through the ends of the yoke member, and is beaded at 17 to permanently secure the yoke member to the insulator.

Figure 7:
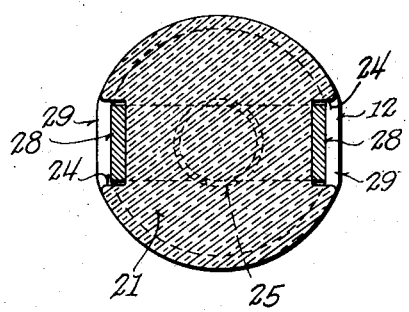
Fig. 7 is a sectional view taken on the line 7—7 of Fig. 5.
Figure 8:
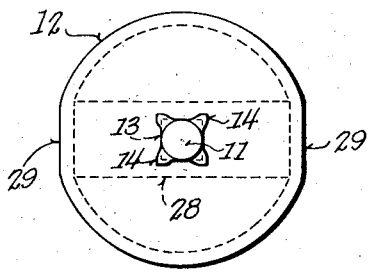
Fig. 8 is a bottom plan view of the device shown in Figs. 5 and 6.

As illustrated in Figs. 7 and 8, the side of the base member 12 may be flattened at 29 to conform to the flat surface of the yoke member 28.

From the foregoing, it will be observed that the intermediate portion of the yoke member in either modification is disposed in the channel at the lower end of the insulator. Thus, when the lag screw is being driven into a support, the sides of the channel and yoke member will engage and serve as means for rotating the lag screw.

As will be observed, the leg portions 6 in effect constitute a base which is relatively smaller in transverse dimension than the transverse dimension of the porcelain at the horizontal plane of the shoulders 7. The vertical dimension of the legs is preferably substantially the same as the depth of the cup or base member 12 surrounding the leg portions 6, thereby engaging the shoulders 7 with the upper margin of the base member 12. In this manner, the shoulders 7 act in a cantilever manner with the upper margin of the base member 12 and prevent lateral distortion of the insulator 1 relative to the base member 12.

Furthermore, the shoulders 7 serve to substantially close the base member 12 and prevent sleet from collecting therein. It has been found desirable to mount the base member 12 on the insulator so that the leg portions 6 are within the base member in order to present a flat contact surface at the base end of the bracket which will not mar or unnecessarily injure the supporting surface with which it may contact.

Another feature which is noteworthy is the fact that the U-shaped metal strip is rigidly secured to the squared end 13 of the screw 11 and transmits directly from the insulator 1 to the screw 11 all torsional force which may be exerted while turning the screw 11 into a supporting structure. None of this force is transmitted directly through the base member 12.

A further feature of this invention resides in the fact that the diagonal portions 9 of the U-shaped strip 8, may serve as resilient portions which draw the shoulders 7 and leg portions 6 into firm contact with the base member 12.

Obviously, the disclosed bracket comprises a novel combination of elements which will be efficient under normal conditions, serviceable when damaged, and manufactured at a minimum cost.

Throughout the description terms are used which in themselves may be interpreted in strict accordance with their specific meanings. However, it is to be understood that these terms are to be given a sufficiently broad interpretation as will include any element which is the equivalent of the specified element. For instance, the rivet 16 may obviously be tubular, be a bolt, or a so-called cotter pin. Likewise, the lag screw 11 may be an ordinary wood screw. Therefore, whenever the claims specifically recite an element, it is to be understood that any equivalent element is included. The essence of the invention is in the combination and not in the individual elements.

I claim:

1. An insulator screw bracket comprising an insulator having a wire-receiving aperture, a bolt-receiving aperture normal to the first mentioned aperture and spaced therefrom, and a channel extending from one end of the bolt-receiving aperture, across one end of the insulator and to the other end of said bolt-receiving aperture; in combination with a yoke member disposed in said channel and extending from one end of said bolt-receiving aperture to the other, a bolt in the bolt-receiving aperture securing the ends of the yoke member to said insulator, a cup-shaped base member embracing the lower ends of said insulator and said yoke member, and a lag screw rigidly secured directly to said yoke member and base member, whereby torsional stresses will be applied directly to the periphery of said insulator and said insulator will be reinforced by said base member.

2. An insulator screw bracket comprising an insulator having a wire-receiving aperture and a channel extending completely around said aperture and in spaced relation thereto; in combination with a yoke member secured to said insulator and disposed in said channel, a cup-shaped base member embracing the lower ends of said insulator and said yoke member, said yoke member and base member having registering apertures, and a lag screw in said registering apertures and non-rotatively secured to said members.

3. An insulator screw bracket comprising an insulator having a wire-receiving aperture and a channel extending completely around said aperture and in spaced relation thereto; in combination with a yoke member secured to said insulator and disposed in said channel, a cup-shaped base member embracing the lower ends of said insulator and said yoke member, said members having registering polygonal apertures, and a lag screw having a polygonal shank portion disposed in and complementary to said polygonal apertures, whereby to secure said screw directly to said members, the corners of said polygonal shank portion being sheared into clamping engagement with said base member to hold said members and screw in substantially rigid and non-rotative relation.

4. An insulator screw bracket comprising an insulator having a wire-receiving aperture, and a channel extending across one end of said insulator, a yoke member secured to said insulator and disposed in said channel, a cup-shaped base member substantially coextensive with the base of and embracing the lower end of said insulator, and a lag screw extending through and non-rotatively secured to said members.

5. In an insulator screw bracket, the combination with an insulator having a transverse perforation at one end and a channel extending about the base of the insulator from one end of the perforation to the other, of a yoke member disposed in said channel and secured to said insulator by means extending through said perforation, and a cup-shaped base member embracing the base of the insulator and the yoke member, said insulator having a shouldered portion extending over the rim of said cup-shaped base member.

CLARENCE J. LEMONT.